United States Patent [19]

Favrot

[11] 4,281,563
[45] Aug. 4, 1981

[54] DEVICE FOR ELIMINATING RESIDUAL UNBALANCE FROM A ROTATING ELEMENT

[75] Inventor: Paul Favrot, Gagny, France

[73] Assignee: Constructions de Clichy, France

[21] Appl. No.: 27,051

[22] Filed: Apr. 4, 1979

[30] Foreign Application Priority Data

Jun. 8, 1978 [FR] France .................................. 78 17117

[51] Int. Cl.³ .......................... F16F 15/22; B24B 5/00
[52] U.S. Cl. ..................................... 74/573 F; 51/169
[58] Field of Search .......................... 74/573 R, 573 F; 51/169

[56] References Cited

U.S. PATENT DOCUMENTS 3,158,039 11/1964 Favrot ..................................... 74/573

3,776,065 12/1973 Unno et al. ............................. 74/573

FOREIGN PATENT DOCUMENTS 2251819 10/1974 France .
619814 8/1978 U.S.S.R. ................................. 74/573 F Primary Examiner—Kenneth Dorner
Attorney, Agent, or Firm—Holman & Stern

[57] ABSTRACT

A rotating element such as a grinding-wheel sleeve rotatably mounted on a stationary central shaft is provided with a plurality of annular balancing chambers which communicate permanently with a source of oil under pressure by means of a common calibrated constriction and with a source of compressed air by means of individual screw-type regulating pintles, each chamber being also connected to a return duct through a constriction.

2 Claims, 8 Drawing Figures

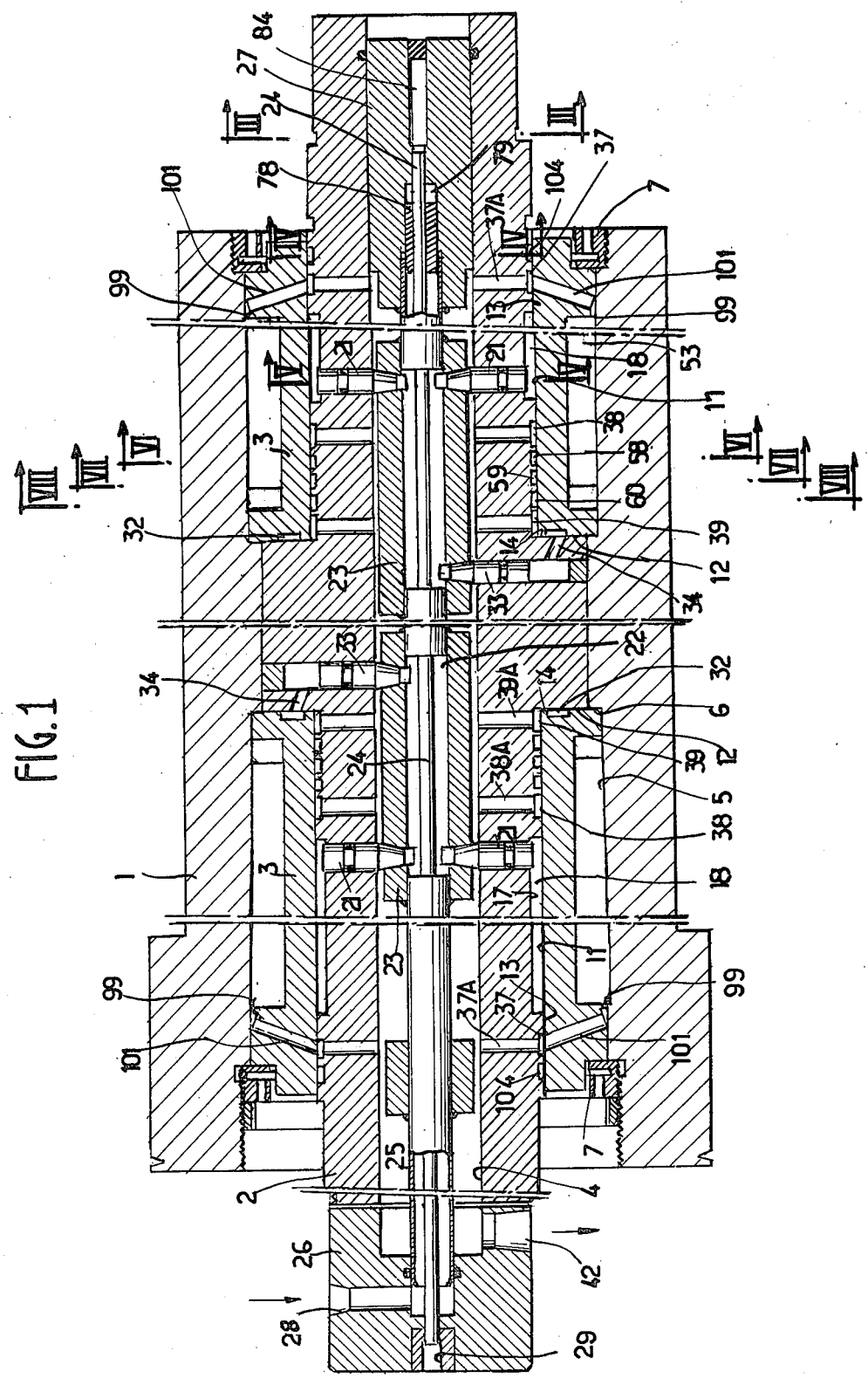

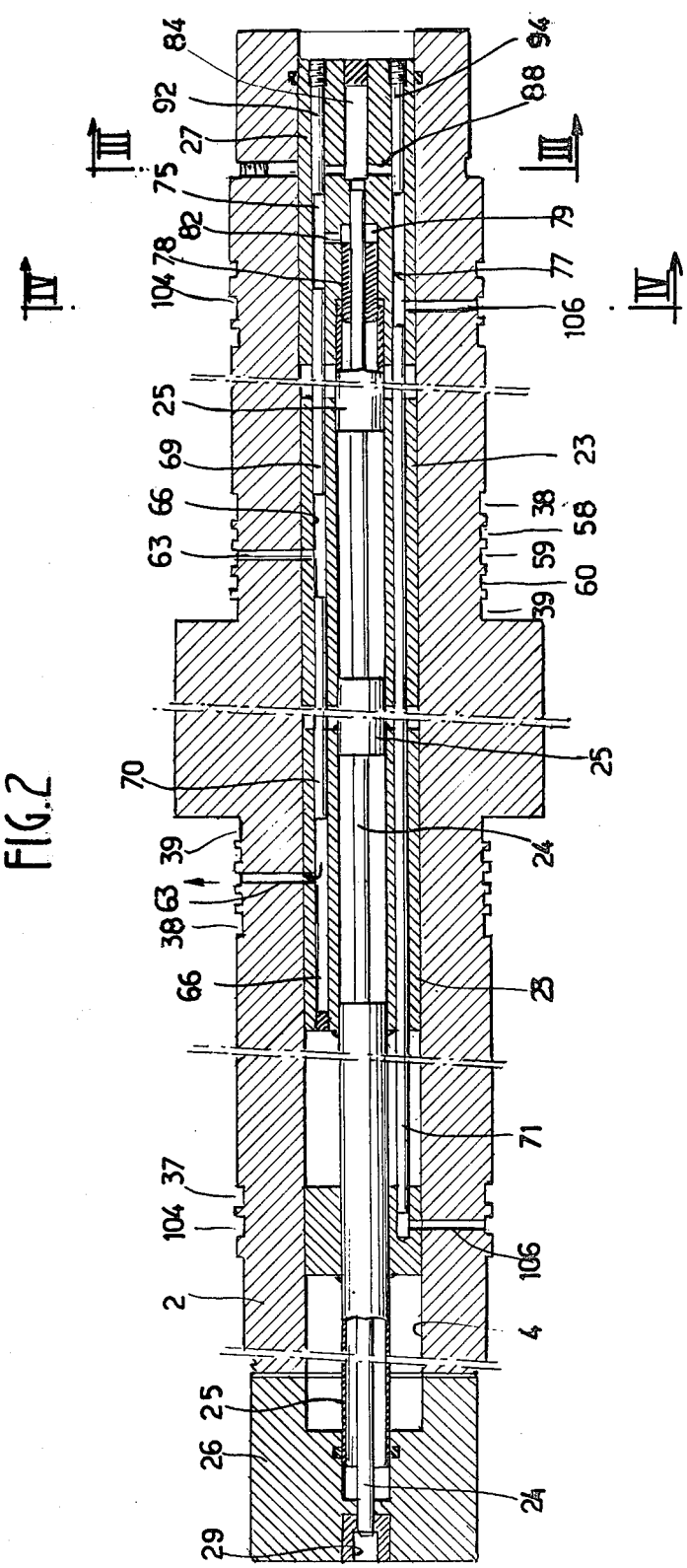

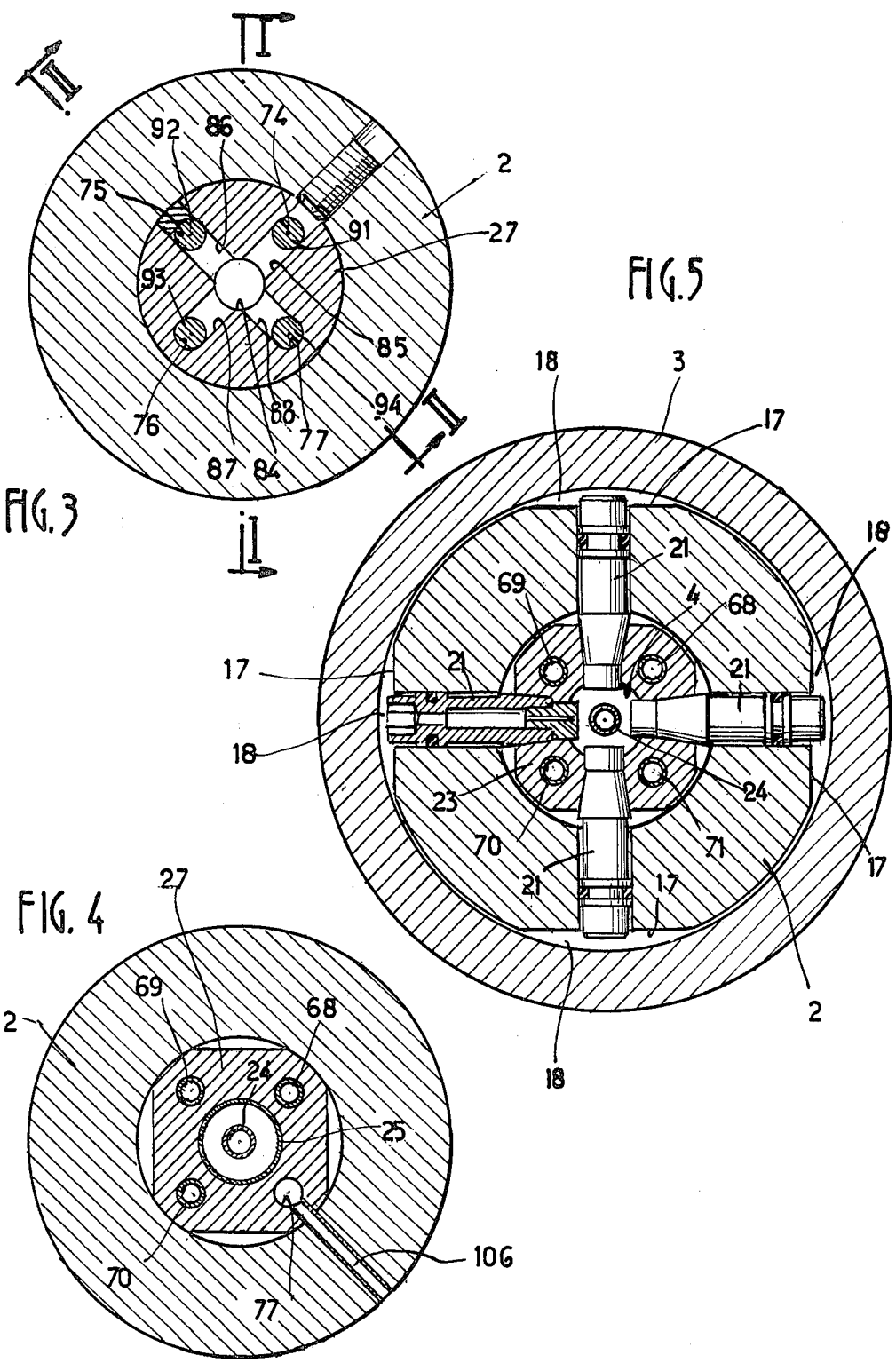

DEVICE FOR ELIMINATING RESIDUAL UNBALANCE FROM A ROTATING ELEMENT

BRIEF SUMMARY OF THE INVENTION

This invention relates to the elimination of residual unbalance of a rotating element and more especially an element which is rotatably mounted on a stationary shaft.

A device for correcting the eccentric unbalance of an element which is fixed on a rotating shaft is already known, as disclosed in particular in French Pat. No. 74 35570 (publication No. 2,251,819). This device comprises an annular reservoir divided into a plurality of balancing chambers each extending over only a fraction of the circumference, the front wall of said reservoir being provided on different radii with openings connected respectively to said chamber. A liquid can be admitted through said openings by means of nozzles at a suitably controlled rate of flow. A device of this type suffers from practical difficulties, especially by reason of the fact that the above-mentioned chambers and their openings are intended to be driven in rotation whereas the liquid injection nozzles are stationary. Moreover, the chambers containing liquid are drained when the rotating element comes to a standstill. When said element is put back into operation, it therefore proves necessary to repeat the process of adjustment for removal of unbalance by means of selected injections of liquid into the different chambers of the annular reservoir.

The aim of the invention is again to adopt the use of an annular reservoir divided into a plurality of chambers in order to eliminate the residual unbalance of a rotating element. Said rotating element is no longer mounted on a rotating shaft, however, but on a stationary shaft by means of bearings, thereby eliminating the above-mentioned disadvantages of the known device recalled in the foregoing.

To this end and in accordance with the invention, the balancing chambers of the annular reservoir continuously communicate through radial holes with corresponding annular channels cut in the cylindrical bearing surface of the stationary shaft. Said channels in turn communicate through ducts formed within said stationary shaft on the one hand with a source of oil under pressure via a calibrated constriction and, on the other hand, with a source of compressed air via screw-type regulating pintles interposed respectively in the supply ducts of said balancing chambers, each chamber being also connected to a return duct through a constriction.

By virtue of this particular structure, the quantity of liquid which is intended to be present within each balancing chamber in order to eliminate unbalance no longer depends on a predetermined quantity of liquid to be fed into said chambers but on the value of the pressure of compressed air to be admitted within each chamber; this value is equal to the value of oil pressure which prevails within said chamber on the radius corresponding to the oil level, starting from the axis of rotation, which determines the volume and consequently the mass of oil which is locally necessary for achievement of balance. In other words, there is thus established a pressure equilibrium between two fluids in a continuous flow regime, namely: the oil through a common calibrated constriction having an invariable cross-sectional area and the compressed air through a calibrated constriction having a cross-sectional area which can be adjusted for each chamber so as to replace within each chamber a certain quantity of oil by lighter air and consequently so as to displace the center of gravity of the volume of oil contained in each chamber as a function of balancing requirements. All the fluid circuits are therefore circuits without any breaks in continuity. The construction of these circuits does not give rise to any problems which are particularly difficult to solve and adjustment of the flow rates of these fluids can be effected readily and conveniently. Moreover, adjustment is not lost when the rotating element comes to a standstill, with the result that, at the time of re-starting, the oil and air pressures are restored within the different chambers exactly to the same values of correct operation as the pressures which existed prior to stoppage.

A device of this type is particularly advantageous in its application to elements rotatably mounted on a stationary shaft by means of hydrostatic bearings.

A more complete understanding of the invention will be gained from the following description and from a study of the accompanying drawings which show one application of the balancing device in accordance with the invention to a rotary wheel-holding sleeve of a grinding machine, the sleeve being mounted on a stationary central shaft.

BRIEF DESCRIPTION OF THE SEVERAL VIEWS OF THE DRAWINGS

In the accompanying drawings:

FIG. 1 is a longitudinal sectional view taken along line I—I of FIG. 3 and showing the assembly constituted by the stationary central shaft and the rotary sleeve equipped with the balancing device;

FIG. 2 is a longitudinal sectional view of the stationary shaft, this view being taken along line II—II of FIG. 3;

FIGS. 3 to 8 are transverse sectional views taken respectively along lines III—III, IV—IV, V—V, VI—VI, VII—VII and VIII—VIII of FIG. 1.

DETAILED DESCRIPTION

Figure 6:
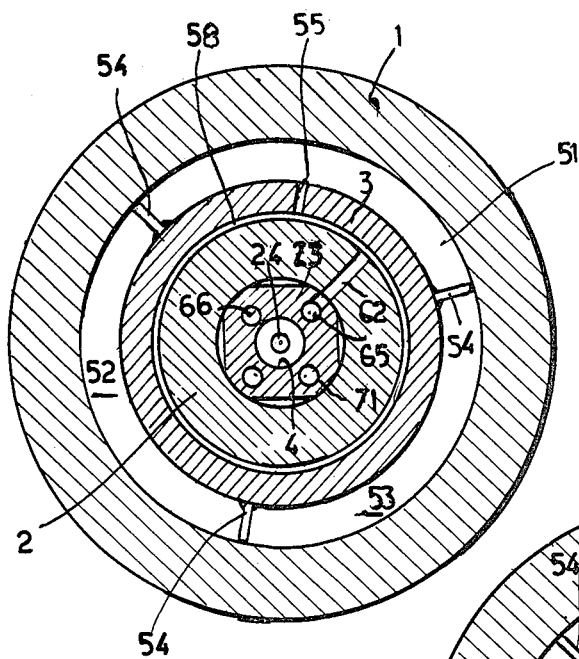

The sleeve 1 which carries a grinding wheel (not shown) is rotatably mounted on a stationary central shaft 2 by means of two hydrostatic bearings 3. Said bearings are maintained in position within two bores 5 of the sleeve against two internal annular shoulders 6 by means of two nuts 7 which are screwed into the threaded ends of two bores 5. The cylindrical radial bearing surface of each bearing 3 is designated by the reference 11 and the front axial-positioning face is designated by the reference 12; the corresponding bearing surfaces on the stationary central shaft 2 are designated respectively by the references 13 and 14. Four flat portions 17 formed in the cylindrical bearing surface 13 of the stationary central shaft 2 (as also shown in FIG. 5) determine four chambers 18 in conjunction with the corresponding surface 11 of the bearing. Said chambers are supplied with oil under pressure respectively by four nozzles 21 which are mounted radially within the shaft and open into an annular cylindrical chamber 22 formed between a bush 23 and a central tube 24. The two bushes 23 of the two bearings are supported by a tube 25 constituted by a number of sections and forming an assembly, the two ends of which are supported within two components 26, 27 which are rigidly fixed respectively to the two ends of the stationary central shaft 2. The tube 24 (to which further reference will be made hereinafter) is also supported at both ends within the two components 26, 27. Oil under pressure is admitted into each chamber 22 through the annular cylindrical gap between the two tubes 24, 25 from a radial bore 28 of the end component 26.

An annular chamber 32 formed in the front face 12 of each bearing 3 is also supplied with oil under pressure from the annular chamber 22 by means of a radial nozzle 33 mounted within the stationary central shaft 2 and by means of a hole 34 which has its opening on the front face 14 of said shaft opposite to the annular chamber 32 of the bearing.

Oil leakages which escape between the bearing surfaces pass within annular return channels 37, 38, 39 and through holes 37A, 38A, 39A which are formed radially in the stationary central tubular shaft, then within the bore 4 of said shaft and escape from said bore through a radial hole 42.

In order to permit elimination of any residual unbalance of the rotating assembly formed by the grinding wheel, the sleeve 1 and the bearings 3, it is proposed to make use of a system comprising a plurality of balancing chambers 51, 52, 53. In the example illustrated, provision is made for three chambers formed within the thickness of the rotary bearings 3 on the side facing the wall of the sleeve 1 to which these latter are secured. Said chambers are separated from each other by three radial partitions 54 placed at 120° with respect to each other.

Figure 7:
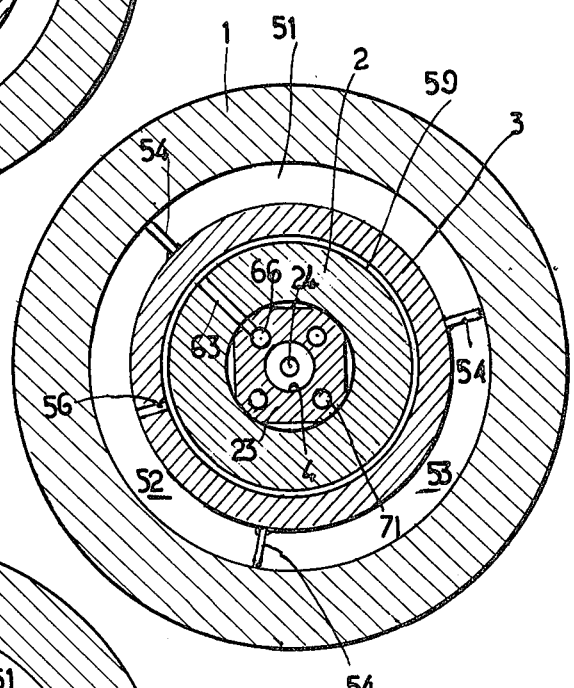
Figure 8:
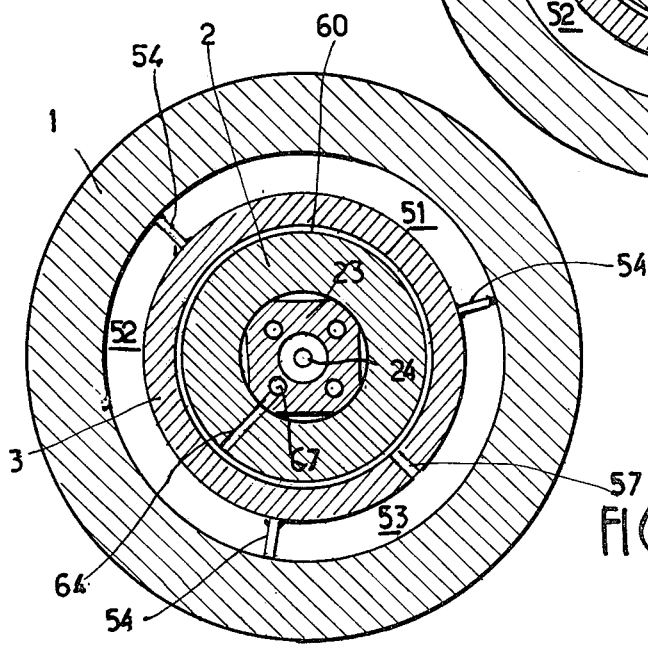

The three chambers 51, 52, 53 are continuously supplied with a mixture of oil under pressure and compressed air. To this end, said chambers communicate respectively with three radial holes formed in the bearings 3, namely the hole 55 (FIG. 6), the hole 56 (FIG. 7), and the hole 57 (FIG. 8). Said holes open respectively into three annular channels 58, 59, 60 of the stationary central shaft 2 and said channels communicate respectively with three radial tubes 62, 63, 64 which pass through the stationary central shaft 2 as well as part of the component 23 (as also shown in FIG. 2) and which in turn have their openings respectively in three longitudinal ducts 65, 66, 67 of the component 23. In said ducts are engaged three tubes 68, 69, 70 which are also engaged in three corresponding longitudinal ducts 74, 75, 76 (FIG. 3) of the end component 27. Provision is made within said end component 27 and within the annular space formed between the two tubes 24 and 25 for a ring 78 in which a clearance of a few hundredths of a millimeter is provided between the bore of said ring and the external surface of the tube 24. Said clearance forms a calibrated constriction through which oil under pressure is permitted to pass so as to reach a chamber 79 which communicates at the same time with all three longitudinal ducts 74, 75, 76 through calibrated holes such as the hole 82 (shown in FIG. 2). Provision is made in the lower end of the component 27 for another chamber 84 in which the compressed-air supply tube 24 has its opening and which communicates through three radial holes 85, 86, 87 (as also shown in FIG. 3), respectively with the three longitudinal ducts 74, 75, 76 under the control of three screw-type regulating pintles 91, 92, 93 which are accessible from the exterior for adjustment purposes.

Thus the circuits for supplying oil and compressed air to the three balancing chambers 51, 52, 53 are as follows:

(a) oil supply circuit: radial bore 28 in the end component 26, annular space between the two central longitudinal tubes 24, 25, gap between the external surface of the tube 24 and the bore of the ring 78, chamber 79, calibrated radial holes such as the hole 82, longitudinal tubes 68, 69, 70, radial tubes 62, 63, 64, annular channels 58, 59, 60 in the stationary central shaft 2, radial bores 55, 56, 57 through the bearings 3, and finally, balancing chambers 51, 52, 53.

(b) compressed air supply circuit: compressed air admission duct 29 at the center of the end component 26 at the end of the stationary central shaft 2, central tube 24, chamber 84 within the other end component 27, radial holes 85, 86, 87, passage along the three regulating pintles 91, 92, 93, and longitudinal ducts 74, 75, 76 in which the compressed air encounters the oil under pressure introduced through the calibrated holes such as the hole 82 and mixes with said oil during its flow path to the balancing chambers 51, 52, 53.

Leakages of oil and compressed air escape from said balancing chambers through constrictions 99, then through ducts 101 which extend through the wall thickness of the bearings 3 and open into the annular channel 37 of the stationary central shaft 2, then join the oil leakages from the chambers 18 of the hydrostatic bearing 3.

The stationary central shaft 2 is further provided in the vicinity of the external ends of the two bearings 3 with two annular sealing channels 104 which are supplied with compressed air from the chamber 84 of the end component 27 through a fourth radial hole 88, a fourth longitudinal duct 77 and a fourth tube 71 and two radial tubes 106. A fourth screw-type regulating pintle 94 housed within the longitudinal duct 77 opposite to the radial hole 88 serves to adjust the pressure of compressed air within the two annular sealing channels 104 to the value of the return pressure at the level of the bore 11 of the bearings 3.

In the absence of any compressed air supply within the three balancing chambers 51, 52, 53, these latter are filled with oil and the pressure gradient existing between the internal and external cylindrical surfaces of said chambers arises from the centrifugal force exerted on the oil. It can be stated in order to give an order of magnitude that, in a concrete application, said gradient has a value of 0.1 bar in respect of a speed of rotation of 1000 revolutions per minute.

Postulating that the three regulating pintles 91, 92, 93 are closed, that the three balancing chambers 51, 52, 53 are filled with oil and that one of said regulating pintles such as the pintle 91, for example, is opened by a quantity such that the pressure of compressed air within the corresponding balancing chamber 51 is within the pressure gradient mentioned above, only part of the oil contained in said chamber escapes from this latter and is replaced by air. Since air is lighter than oil, the center of gravity of the rotating assembly is thus slightly displaced. As can readily be understood, it is possible in this manner to compensate for a slight residual unbalance.

In order to carry out this compensation, the mode of procedure will be as follows:

At the outset, the three regulating pintles 91, 92, 93 for supplying the balancing chambers with compressed air are closed and the three chambers are therefore full of oil. If the appearance of a slight unbalance is detected by means of conventional methods and equipment, the initial operation consists in slightly opening any one of the three regulating pintles 91, 92, 93 such as the pintle 91, for example. Two cases may arise. In the first case, the defect decreases; unscrewing of the pintle is continued, thereby admitting compressed air under an increasing pressure into the corresponding balancing chamber 51 until the defect no longer decreases and is about to increase again; the pintle is then allowed to remain at this degree of opening, whereupon one of the two other pintles 92 or 93 is progressively opened to a degree corresponding to complete suppression of unbalance and said pintle is also left at this degree of opening.

In the second case, the defect increases, whereupon the first regulating pintle which had already been opened to an initial extent is re-closed; another pintle such as the pintle 92 is then progressively opened to a position which permits reduction of unbalance to a minimum value and is left in this position, whereupon progressive opening of the third regulating pintle 93 is carried out up to a position which ensures complete suppression of unbalance, said third pintle being then left in this position.

What is claimed is:

1. In a device comprising a stationary central shaft, having a cylindrical outer bearing surface, and a rotary element rotatably mounted co-axially with said shaft by a bearing means on said cylindrical outer bearing surface of said stationary central shaft, residual unbalance eliminating means comprising:
    a plurality of arcuate balancing chambers in said rotary element regularly coaxially distributed about the axis of rotation of said rotary element;
    a plurality of corresponding annular channels in said cylindrical outer bearing surface of said stationary central shaft;
    a plurality of radial holes in said rotary element each communicating respectively between one of said arcuate balancing chambers and one of said corresponding annular channels;
    a plurality of corresponding longitudinal ducts in said stationary central shaft each communicating respectively with one of said corresponding annular channels;
    a source of oil under pressure;
    an oil-supplying chamber in said stationary central shaft communicating with said source of oil;
    an oil chamber in said stationary central shaft communicating with said longitudinal ducts;
    a first calibrated constriction means in said stationary central shaft between said oil-supplying chamber and said oil chamber;
    a source of compressed air;
    a compressed air chamber in said stationary central shaft communicating with said source of compressed air;
    a plurality of regulating pintles with inlets and outlets in said stationary central shaft, said inlets of said pintles communicating with said compressed air chamber and each of said outlets of said pintles communicating respectively with one of said corresponding longitudinal ducts;
    a plurality of second constriction means in said rotary element each having inlet and outlet means, said inlet means of each of said second constriction means communicating respectively with one of said arcuate balancing chambers; and
    an oil and compressed air leakage escape means in said rotary element and said stationary central shaft communicating with said outlets of said second constriction means and having an outlet from said stationary central shaft.

2. A device as claimed in claim 1 and further comprising hydrostatic chambers provided in said cylindrical outer bearing surface at the interface between said outer bearing surface and said bearing means, and annular sealing channels in said cylindrical outer bearing surface of said stationary central shaft at said interface and disposed between said hydrostatic chambers and the end of said bearing means;
    radial holes in said stationary central shaft communicating with said annular sealing channels;
    further longitudinal duct means in said stationary central shaft communicating with said last named radial holes;
    a further regulating pintle having an inlet and an outlet in said stationary central shaft, said inlet of said further regulating pintle communicating with said compressed air chamber and said outlet of said further regulating pintle communicating with said further longitudinal duct means;
    a plurality of radial nozzles each having an inlet and an outlet in said stationary central shaft, said inlets of said radial nozzles communicating with said oil-supplying chamber and said outlets of said radial nozzles each communicating respectively with one of said hydrostatic chambers;
    annular oil return channels in said cylindrical outer bearing surface of said stationary shaft for said hydrostatic chambers; and
    oil return duct means communicating with said annular oil return channels and with an outlet from said stationary central shaft.

* * * * *